(12) United States Patent
Johannes

(10) Patent No.: US 7,179,312 B2
(45) Date of Patent: Feb. 20, 2007

(54) INHIBITING OF EROSION OF VESSLS

(75) Inventor: De Klerk Barend Johannes, Secunda (ZA)

(73) Assignee: Sasol Technology (Proprietyary) Limited, Johannesburg (ZA)

( * ) Notice: Subject to any disclaimer, the term of this patent is extended or adjusted under 35 U.S.C. 154(b) by 0 days.

(21) Appl. No.: 11/195,377

(22) Filed: Aug. 2, 2005

(65) Prior Publication Data

US 2006/0037245 A1    Feb. 23, 2006

Related U.S. Application Data

(60) Division of application No. 09/960,221, filed on Sep. 21, 2001, which is a continuation of application No. PCT/IB00/00449, filed on Apr. 10, 2000, now Pat. No. 6,939,384.

(30) Foreign Application Priority Data

Apr. 14, 1999  (ZA) ................................ 99/2726

(51) Int. Cl.
 *B01J 8/02*    (2006.01)
(52) U.S. Cl. .......................... 48/61; 422/241
(58) Field of Classification Search ............ 48/61, 48/62 R, 74, 86 R, 87, 89, 119, 127.9, 198.1, 48/198.7, 211, 212, 213, 214 A, 214 R, 215; 422/211, 240, 241
See application file for complete search history.

(56) References Cited

U.S. PATENT DOCUMENTS 2,711,308 A * 6/1955 Cogan ..................... 261/113
3,645,700 A * 2/1972 Nagamura et al. ........... 422/146
4,407,355 A * 10/1983 Bonn et al. ............. 165/104.16
4,954,402 A 9/1990 Houston ...................... 428/597
5,016,576 A 5/1991 Bornemann et al. ......... 122/4 D
5,239,945 A * 8/1993 McCoy ....................... 122/4 D
5,861,130 A 1/1999 Werhahn et al. ............. 422/143
6,939,384 B2 * 9/2005 Johannes ......................... 48/74

FOREIGN PATENT DOCUMENTS

| DE | 3117195 | 11/1982 |
|---|---|---|
| EP | 0959120 | 11/1999 |
| JP | 8-110007 | * 4/1996 |
| JP | 08110007 | 4/1996 |

OTHER PUBLICATIONS

Patent Abstracts of Japan of 08110007 Dated Apr. 30, 1996.
"Advances in Modelling Improve Designs" Nitrogen, No. 217 (1995) pp. 26, 28, 30-31.
English Abstract of DE 3 117 195 dated Nov. 11, 1982.

* cited by examiner

*Primary Examiner*—Kevin P. Kerns
(74) *Attorney, Agent, or Firm*—Ladas and Parry LLP

(57) ABSTRACT

A process vessel includes a body defining an interior vessel surface and a fixed catalyst bed in the body. A retainer is provided on the fixed catalyst bed to retain the fixed catalyst bed in position. The retainer defines at least one trapping formation at or in close proximity to the interior vessel surface above the fixed bed catalyst to trap solid objects whirled around in an annular zone above the fixed catalyst bed by fluid passing through the vessel, which whirling solid objects can erode the interior vessel surface in the annular zone.

11 Claims, 3 Drawing Sheets

INHIBITING OF EROSION OF VESSLS

This is a divisional of application Ser. No. 09/960,221 filed on Sep. 21, 2001 (now U.S. Pat. No. 6.939,384), which is a continuation of PCT/IB00/00449 filed Apr. 10, 2000 claims the benefit thereof and incorporates the same by reference.

FIELD OF THE INVENTION

THIS INVENTION relates to the inhibiting of erosion of vessels. In particular, it relates to a method of inhibiting erosion of an interior surface of a process vessel, such as an interior refractory surface of a reformer, to a process vessel and to a method of converting a reformer.

BACKGROUND OF THE INVENTION

In a reformer designed from the start to operate with an open flame reaction zone above a catalyst bed, the gas velocity through the reformer is high enough to move catalysts, leading to erosion of the catalysts and erosion of the refractory of the reformer. When a reformer is converted from having a catalyst bed but no open flame reaction zone above the catalyst bed, to having the catalyst bed and an open flame reaction zone above the catalyst bed, this situation is exacerbated by the even higher gas velocities in the converted reformer. In such a converted reformer, the gas velocities may even be high enough to move the original bricks or tiles in the brick or tile layer which is typically used to inhibit movement of the catalyst particles in the catalyst bed. This causes erosion of the refractory. In addition, pieces of the refractory above the tile or brick layer and sometimes pieces of the tiles or bricks break loose and can then be whirled around the inner periphery of the reformer, in an annular zone extending from the tile or brick layer upwards for a short distance, e.g. about 30 cm.

The present invention proposes solutions to the abovementioned problems, which include trapping the whirling solid objects and changing the physical characteristics of the brick or tile layer. U.S. Pat. No. 3,645,700 provides an improved vessel for fluidised bed reactions, characterised by the provision of metal or non-metal projections of various shapes at calculated intervals on the internal side wall of the vessel. U.S. 3,645,700 thus teaches the prevention of wear of the internal surface of the wall by contacting the projections with the fluidised solid particles, whereafter the solid particles are deflected from the projections without directly contacting the reactor wall. This document is thus not concerned with solid objects whirling around in an annular zone or with reducing the movement of the tile or brick layer and the underlying catalyst of a fixed bed reactor. U.S. Pat. No. 5,016,576 discloses a combustion chamber for combusting fine-grained fuels in a fluidised bed. The combustion chamber has a refractory lining provided at its top end with a cornice, which is enlarged in width. The method employed by U.S. Pat. No. 5,016,676 is to build up a protective body or bed of the fuel solids on the cornice covering the most highly endangered region of the combustion chamber wall and the use of a cornice as described in U.S. Pat. No. 5,016,576 will not solve the abovementioned problems. DE 3117195 discloses a process and apparatus in which the heat, material and momentum exchange in the direct vicinity of the wall of a fluidised bed reactor is reduced. This is achieved by increasing the flow resistance for the fluid in the vicinity of the wall to such an extent that in this area the fluidised bed is no longer boiling. DE 3117195 thus does not deal with solid objects whirling around in an annular path nor with the unwanted movement of catalysts in a fixed bed nor the movement of the tile or brick layer above the catalyst bed. JP 08110007 relates to a heat exchanger which includes tube walls and loop pipes and discloses the use of an erosion baffle to prevent excessive abrasion of the bent ends of the loop pipes by coal ash. JP 08110007 does not propose a solution for dealing with solid objects whirled around in an annular zone against the interior surface of a process vessel. U.S. Pat. No. 4,954,402 discloses a retarder for preventing the erosion of refractory material at a refractory corner over which fluid flows. The retarder is embedded within the refractory material and U.S. Pat. No. 4,954,402 thus does not propose any solutions to the abovementioned problems.

SUMMARY OF INVENTION

According to a first aspect of the invention, there is provided a method of inhibiting erosion of an interior surface of a process vessel by solid objects whirled around in an annular zone against the interior surface of the process vessel by a fluid passing over the interior surface, the method including providing at least one formation in said annular zone to trap the whirling solid objects.

The method may include providing a plurality of circumferentially spaced formations in said annular zone in a plane angularly displaced relative to the direction of travel of the fluid.

Thus, the method may include providing a plurality of circumferentially spaced formations at or in close proximity to an annular portion or zone of the interior surface expected to be most affected by erosion. The formations may be provided in a horizontal plane and may be equidistantly spaced.

The process vessel may be a reformer for producing synthesis gas, e.g. an autothermal or secondary reformer.

The objects may be trapped in bays or pockets defined between pairs of formations or between each formation and the interior surface of the vessel, as the case may be.

According to a second aspect of the invention, there is provided a method of inhibiting erosion of an interior refractory surface of a reformer for producing synthesis gas, by solid objects whirled around in an annular zone against the interior refractory surface by a gas stream passing over the interior refractory surface, the method including providing at least one formation at or in close proximity to the refractory surface in the path of the whirling solid objects to trap the whirling solid objects.

A plurality of formations may be provided. Each formation may trap the solid objects, the objects being trapped in bays or pockets defined between pairs of formations or between each formation and the interior refractory surface, as the case may be.

Typically, the reformer includes a catalyst bed with retaining means on the catalyst bed for retaining the catalyst bed in position in the face of high gas velocities in the reformer. The retaining means may be a generally horizontally extending tile or brick layer, the tiles or bricks being configured to allow gas to pass downwardly through the tile or brick layer. Pieces of refractory lining above the tile or brick layer and sometimes pieces of the tiles or bricks can, however, in use break loose and can then be whirled around the inner periphery of the reformer in an annular zone above the tile or brick layer by the gas flowing through the reformer, particularly in reformers converted to include an open flame reaction zone above the catalyst bed, and to reformers operated at higher gas throughput than originally designed for. These solid objects erode the refractory surface in an annular band or zone extending for a short distance, e.g. 30 cm, above an upper surface of the tile or brick layer.

Preferably, the method includes providing a plurality, e.g. six, formations at or in close proximity to the interior refractory surface and above the upper surface of the tile or brick layer so that the formations are located within the whirling flow path of the solid objects.

In one embodiment of the invention, providing a plurality of formations includes placing a plurality of tiles or bricks, e.g. six, each having an increased depth or thickness compared to other tiles or bricks in the layer of tiles or bricks, at spaced peripheral positions in the layer of tiles or bricks, adjacent the interior refractory surface. Typically, the tiles or bricks of increased depth or thickness are equidistantly spaced.

According to a third aspect of the invention, there is provided a process vessel which includes
a body defining an interior vessel surface;
a catalyst bed in the body;
retaining means on the catalyst bed for retaining the catalyst bed in position; and
at least one formation at or in close proximity to the interior vessel surface above the retaining means for trapping solid objects whirled around in an annular zone above the retaining means by a fluid passing through the vessel, which whirling solid objects can erode the interior vessel surface above the retaining means.

The process vessel may be a reformer for the production of synthesis gas. The retaining means may include a generally horizontally extending layer of tiles or bricks laid on top of the catalyst bed, the layer of tiles or bricks allowing fluid to pass downwardly through the layer. The vessel may include a plurality e.g. six, spaced formations for interfering with fluid flow above the layer of tiles or bricks. Each formation may be defined by a tile or brick in the layer having an increased depth or thickness compared to the depth or thickness of other tiles or bricks in the layer. The tiles or bricks of increased depth or thickness may be located at circumferentially equidistantly spaced peripheral positions in the layer of tiles or bricks, and each tile or brick of increased depth may act to trap the gas-borne solid objects in a bay or pocket defined between the brick or tile of increased depth and the interior vessel surface, or between two such bricks or tiles.

Each tile or brick may be polygonal in outline in plan view, e.g. hexagonal or part-hexagonal in plan view. Thus, some of the tiles or bricks may be regular hexagonal in plan view, some may be trapezoidal and half of a regular hexagon in plan view, and some may be pentagonal shaped in plan view to allow the tiles or bricks to be laid out next to one another in abutting side by side relationship in a horizontal plane to form a roughly hexagonal plane figure in outline in plan view having extremities which fall on the outline of a hexagon and a circle.

At least some of the bricks or tiles may include a plurality of passages extending therethrough between an opening in a top surface and an opening in a bottom surface of each of said some bricks or tiles. At least 15% of a top surface area of each apertured brick or tile may be occupied by the openings of the passages. Preferably, the percentage of the top surface area of each apertured brick or tile occupied by the openings is at least 20%, e.g. 21%. Typically, however, at least some, e.g. seven, centrally located bricks or tiles have no passages.

A ratio between the depth or thickness of the bricks or tiles having an increased depth or thickness to the depth or thickness of the other bricks or tiles in the layer may be between 1.5:1 and 2:1. Preferably, the ratio is between 1.8:1 and 1.9:1. In one embodiment, the ratio is between 1.82:1 and 1.84:1, e.g. 1.83:1.

Examples of suitable materials for the bricks or tiles are high purity alumina ($Al_2O_3$) brick or calcium bonded tabular alumina castable with an alumina content of greater than 96% by weight.

According to a fourth aspect of the invention, there is provided a method of converting a reformer for production of synthesis gas having a catalyst bed but no open flame reaction zone above the catalyst bed, to a reformer having a catalyst bed and an open flame reaction zone above the catalyst bed, the method including providing at least one formation at or in close proximity to an interior refractory surface of the reformer at an elevation at which erosion of the refractory surface of the converted reformer due to gas-borne whirling solid objects travelling in an annular zone is expected, the formation acting to trap the whirling solid objects.

The reformer may include retaining means on the catalyst bed for retaining the catalyst bed in position. The formation may be provided so that it interferes with the movement of solid objects expected to be carried by the gas in a whirling flow path above the retaining means.

The retaining means may include a layer of bricks or tiles laid on top of the catalyst bed. The method may include replacing at least some of the existing bricks or tiles in the layer with replacement bricks or tiles which are larger in plan view and/or which are heavier, compared to the existing bricks or tiles in the layer.

Preferably, the method includes providing a plurality of formations at or in close proximity to the interior refractory surface of the reformer at the elevation at which erosion of the refractory surface due to gas-borne solid objects is expected. Each formation may be defined by a brick or tile in the layer having an increased depth or thickness compared to the depth or thickness of other tiles or bricks in the layer. The bricks or tiles and the layer of bricks or tiles may thus be as hereinbefore described.

The tiles or bricks of increased depth or thickness may thus be located at circumferentially equidistantly spaced peripheral positions in the layer of tiles or bricks.

All of the existing bricks or tiles in the layer may be replaced with replacement bricks or tiles. Some of the replacement bricks or tiles may be regular hexagonal in plan view, some of the replacement bricks or tiles may be trapezoidal and half of a regular hexagon in plan view, and some of the replacement bricks or tiles may be pentagonal shaped in plan view, allowing the replacement bricks or tiles to be laid out next to one another in abutting side by side relationship in a horizontal plane to form a roughly hexagonal plane figure in outline in plan view having extremities which fall on the outline of a hexagon and a circle, as hereinbefore described.

Each replacement brick or tile of standard depth may have the same nominal diameter, a ratio between the nominal diameter and a thickness or depth of each replacement brick or tile of standard depth being between 4:1 and 1:1. Preferably, the ratio between the nominal diameter and the thickness or depth of these replacement bricks or tiles are between 3:1 and 2:1, e.g. 2.5:1. By nominal diameter is meant the diameter of a circle on which the extremities of each replacement brick or tile fall in plan view.

BRIEF DESCRIPTION OF THE DRAWINGS

The invention will now be described, by way of example, with reference to the accompanying diagrammatic drawings, in which.

DETAILED DESCRIPTION OF THE INVENTION

Figure 1:
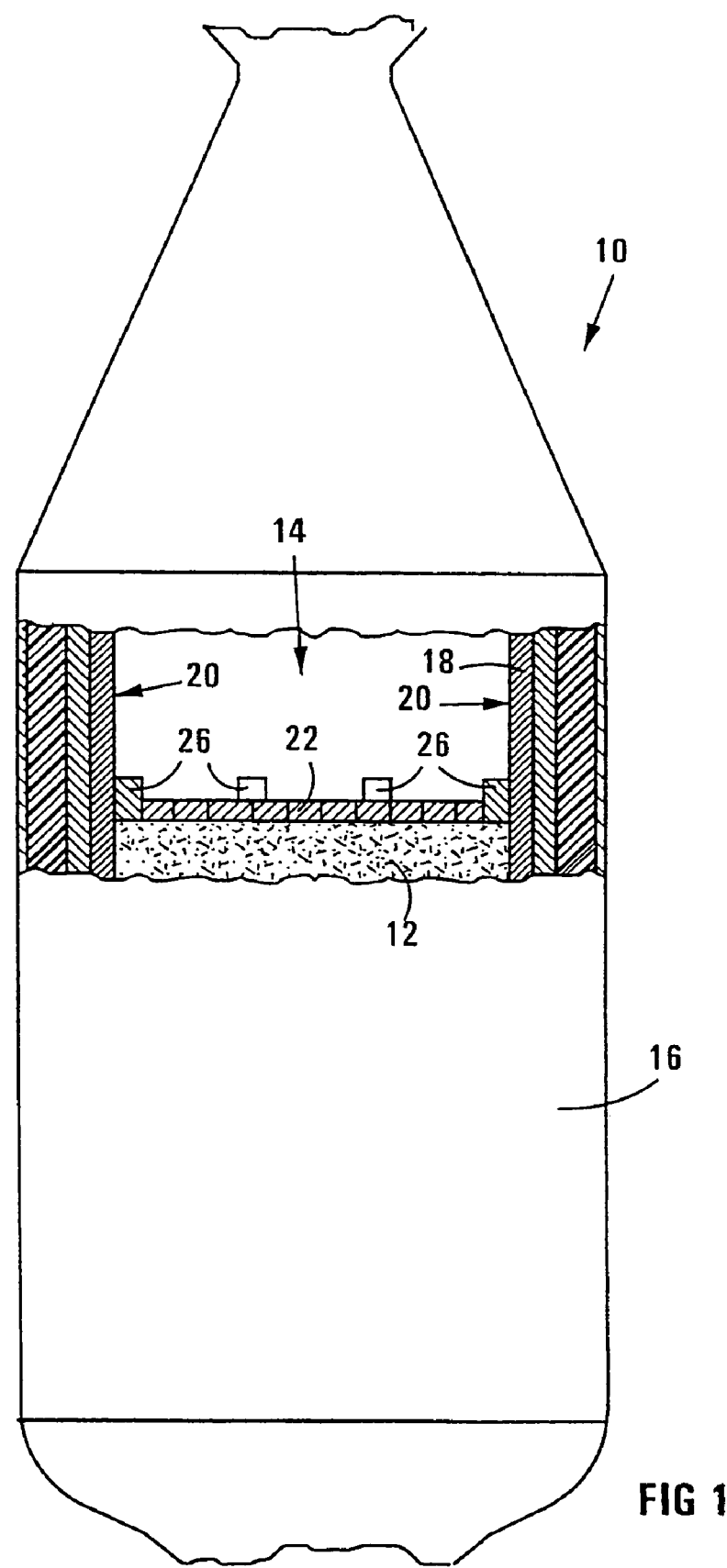
FIG. 1 shows a partially sectioned side elevational view of a reformer converted in accordance with the invention.

Referring to FIG. 1 of the drawings, reference numeral 10 generally indicates a vertically orientated reformer converted in accordance with the invention. The reformer 10 is suitable for the production of synthesis gas and has, been converted from having a catalyst bed 12 but no open flame reaction zone above the catalyst bed 12, to having the catalyst bed 12 and an open flame reaction zone 14 above the catalyst bed 12.

The reformer 10 includes a body 16 which includes a refractory layer 18 defining an interior vessel surface 20. Retaining means, in the form of a horizontally extending brick or tile layer 22, rests on the catalyst bed 12 for retaining the catalyst bed 12 in position in use. The reformer 10 has an internal diameter of 2.104 m.

Figure 2:
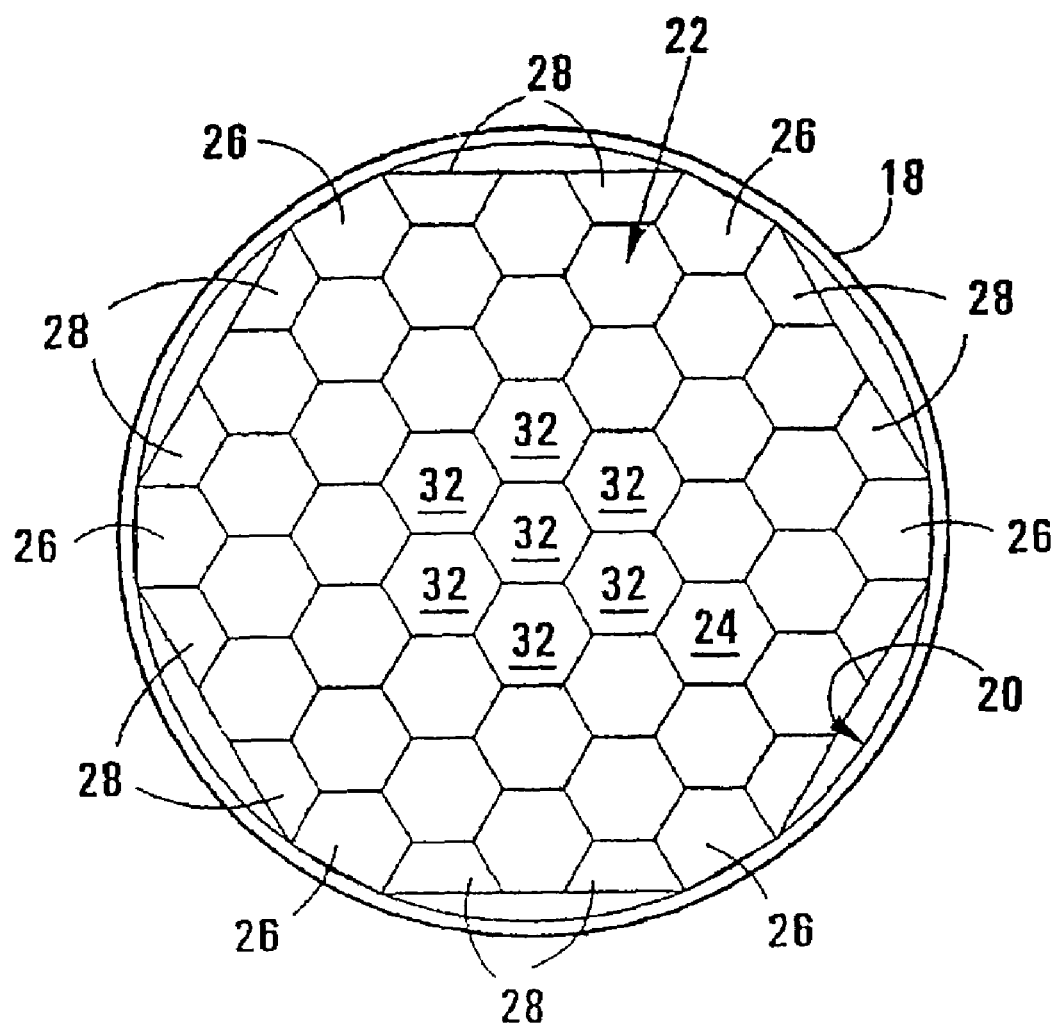
FIG. 2 shows a top plan view of a brick or tile layer of the reformer of FIG. 1.
Figure 3:
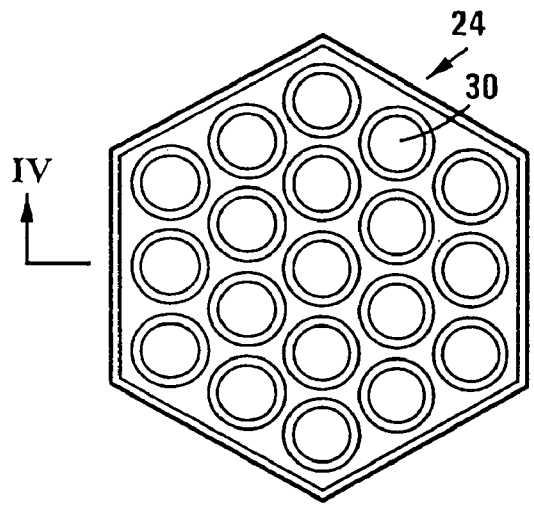
FIG. 3 shows a top plan view of a hexagonal brick or tile of the brick or tile layer of FIG. 2.

With reference to FIG. 2 of the drawings, the brick or tile layer 22 forms a roughly hexagonal plane figure in outline in plan view, having extremities in the form of rounded or bevelled corners which fall on the outline of a hexagon, as well as on the outline of a circle. The layer 22 comprises thirty tiles or bricks 24 which are regular hexagonal in plan view, six tiles or bricks 26 which are pentagonal in plan view and twelve tiles or bricks 28 which are a trapezoidal half of a hexagon in plan view. As shown in FIG. 2 of the drawings, the tile or brick layer 22 substantially spans the interior of the reformer 10.

The pentagonal tiles or bricks 26 are located at positions corresponding to the six rounded corners of the hexagonal layer 22 defined by the tiles or bricks 24, 26, 28. The tiles or bricks 26 are thus located at clrcumferentlally equidistantly spaced peripheral positions in the layer 22 of tiles or bricks, in close proximity to the interior vessel surface 20 defined by the refractory layer 18. An expansion gap (not shown) of 21 mm is provided between, each brick or tile 26 and the interior vessel surface 20.

Each hexagonal brick or tile 24 has a nominal diameter of 300 mm and a thickness or depth of 120 mm. Thus, a ratio between the diameter and the depth of each brick or tile 24 is 2.5:1. Nineteen circular cylindrical passages 30 extend respectively between openings in a top surface and openings in a bottom surface in each brick or tile 24 (not shown in FIG. 2). The centres of the passages 30 are spaced 55 mm apart from each other. Thus, the passages are arranged in a regular hexagonal layout. The percentage of the top surface area of each apertured brick or tile 24 occupied by the openings of the passages 30 is 25.8%. However, seven centrally located regular hexagonal tiles or bricks 32 do not have any passages extending through them.

Figure 4:
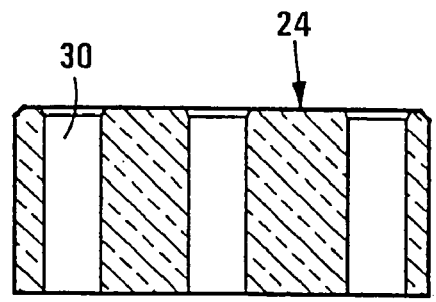
FIG. 4 shows a sectioned side view of the brick or tile of FIG. 3 taken at IV—IV in FIG. 3.
Figure 5:
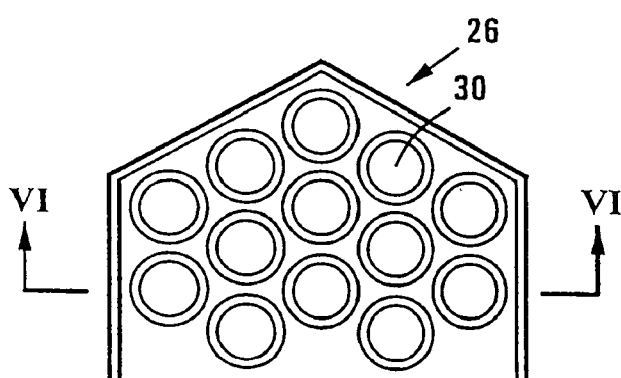
FIG. 5 shows a top plan view of a pentagonal brick or tile of the brick or tile layer of FIG. 2.
Figure 6:
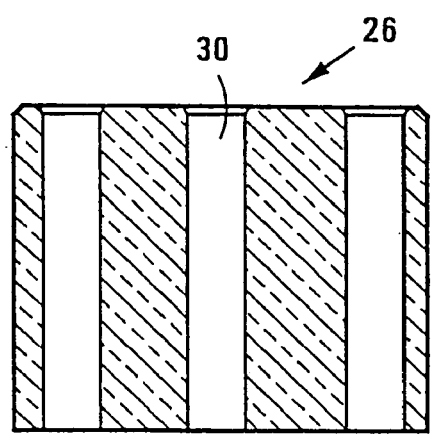
FIG. 6 shows a sectioned side view of the brick or tile of FIG. 5 taken at VI—VI in FIG. 5.
Figure 8:
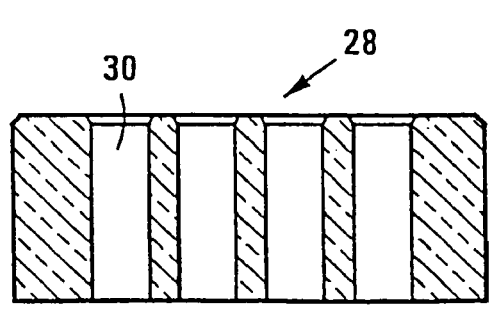
FIG. 8 shows a sectioned side view of the brick or tile of FIG. 7, taken at VIII—VIII in FIG. 7.

Referring to FIG. 6 of the drawings, and comparing FIG. 6 to FIGS. 4 and 8 of the drawings, it is apparent that the pentagonal tiles or bricks 26 are deeper or thicker than the tiles or bricks 24, 28. Each tile or brick 26 has a thickness or depth of 220 mm and a nominal diameter of 300 mm.

Each half hexagonal tile or brick 28 has a nominal diameter of 300 mm and a depth or thickness of 120 mm, which is the same as the depth or thickness of the tiles or bricks 24.

Figure 7:
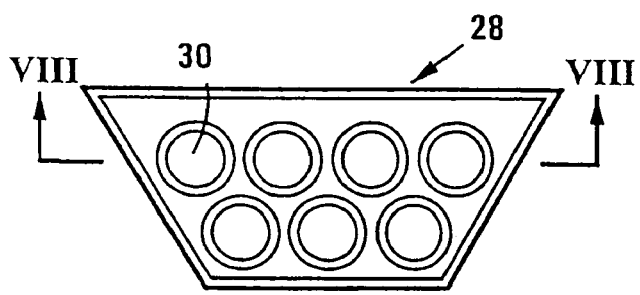
FIG. 7 shows a top plan view of a half hexagonal brick or tile of the brick or tile layer of FIG. 2.

As shown in FIGS. 6 and 7 of the drawings, the tiles or bricks 26, 28 also have circular cylindrical passages 30 extending through them. Each passage has a diameter of 32 mm, which is the same as the diameter of the passages 30 extending through the hexagonal tiles or bricks 24. Thus, the bricks or tiles 26, 28 have fewer passages than the bricks or tiles 24, thirteen in the case of the bricks or tiles 26, and seven in the case of the half hexagonal bricks or tiles 28.

In use, hydrocarbon gas, such as methane, is reacted thermally and catalytically with steam and oxygen in the reformer 10 at a temperature of about 800° C. to 1300° C. to produce synthesis gas which includes CO, $H_2$ and $CO_2$. The gas is passed vertically downwardly through the reformer 10, from the open flame reaction zone 14 through the brick or tile layer 22 and the catalyst bed 12. The hydrocarbons are reformed in an open flame in the open flame reaction zone 14 above the brick or tile layer 22, as well as in the catalyst bed 12. However, as the reformer 10, prior to being converted to a reformer which includes an open flame reaction zone 14, included only the catalyst bed 12 and not the open flame reaction zone 14, it has an internal diameter which is relatively small compared to the internal diameter of other reformers designed from the start to operate with an open flame reaction zone as well as a catalyst bed and having the same design throughput as the reformer 10. As a result, higher gas velocities are encountered in the open flame reaction zone 14, as well as in the rest of the converted reformer 10, compared to said other reformers.

In a reformer designed from the start to operate with an open flame reaction zone 14 and a catalyst bed 12, the gas velocity through the reformer is high enough to move catalyst and refractory particles, leading to erosion of the catalyst and erosion of the refractory layer 18. As will be appreciated, this situation is exacerbated by the even higher gas velocities in the converted reformer 10. Erosion products build up in the catalyst bed 12, leading to an increased pressure drop through the catalyst bed 12 and to a lower throughput through the reformer 10. Thus, the purpose of the brick or tile layer 22 is to inhibit movement of the catalyst particles in the catalyst bed 12.

As mentioned above, the gas velocity through the converted reformer 10 is even higher than the gas velocities through reformers which were designed from the start to operate with an open flame reaction zone and a catalyst bed. The high gas velocities cause movement of the catalyst particles and of the original bricks or tiles in the brick or tile layer, if they are retained in the converted reformer, thus causing erosion of the refractory layer 18. In addition, pieces of the refractory layer 18 above the tile or brick layer 22 and sometimes pieces of the tiles or bricks of the layer 22 break loose and can then be whirled around the inner periphery of the reformer 10, in an annular zone above the tile or brick layer 22, by the gas flowing through the reformer 10. These solid objects typically erode the refractory surface in an annular band extending for a short distance, e.g. about 30 cm, above the tile or brick layer 22.

The bricks or tiles 24, 26, 28 of the converted reformer 10 are thus larger in plan view and heavier, compared to the original bricks or tiles which were used to make up the brick or tile layer 22 in the reformer 10 prior to the conversion of the reformer 10 in accordance with the invention and immediately after the conversion of the reformer 10 to operate with the open flame reaction zone. This inhibits the moving or lifting of the bricks or tiles owing to the high gas velocity through the converted reformer 10. Furthermore, the bricks or tiles 26 of increased height each define a bay or pocket in which solid objects whirled around the reformer 10 above the layer 22 by the gas passing through the reformer 10 can be trapped, thus inhibiting erosion of the refractory layer 18 above the tile or brick layer 22.

It is an advantage of the invention, as illustrated, that it provides a relatively cheap option to inhibit erosion of surfaces of a reformer which has been converted to include an open flame reaction zone, or which is operated above its original design throughput.

The invention claimed is:

1. A process vessel which includes
a body defining an interior vessel surface;
a catalyst bed in the body; and
retaining means on the catalyst bed for retaining the catalyst bed in position, the retaining means including a generally horizontally extending layer of tiles or bricks laid on top of the catalyst bed, the layer of tiles or bricks allowing fluid to pass downwardly through the layer, the vessel including a plurality of spaced formations for trapping solid objects whirled about in an annular zone above the retaining means by a fluid passing through the vessel, which whirling solid objects can erode the interior vessel surface above the retaining means, each formation being defined by a tile or brick in the layer having an increased depth or thickness compared to the depth or thickness of other tiles or bricks in the layer and thus projecting above the other tiles or bricks in the layer, some of the tiles or bricks being regular hexagonal in plan view, some being trapezoidal and half of a regular hexagon in plan view, and some being pentagonal shaped in plan view, allowing the tiles or bricks to be laid out next to one another in abutting side by side relationship in a horizontal plane to form a roughly hexagonal plane figure in outline in plan view having extremities which fall on the outline of a hexagon and a circle.

2. A vessel as claimed in claim 1, in which the tiles or bricks of increased depth or thickness are located at circumferentially equidistantly spaced peripheral positions in the layer of tiles or bricks.

3. A vessel as claimed in claim 1, in which at least some of the bricks or tiles include a plurality of passages extending therethrough between an opening in a top surface and an opening in a bottom surface of each of said some bricks or tiles, at least 15% of a top surface area apertured brick or tile being occupied by the openings of the passages.

4. A vessel as claimed in claim 3, in which the percentage of the top surface area of each apertured brick or tile occupied by the openings is at least 20%, at least some centrally located bricks or tiles having no passages.

5. A vessel as claimed in claim 1, in which a ratio between the depth or thickness of the bricks or tiles having an increased depth or thickness to the depth or thickness of the other bricks or tiles in the layer is between 1:5:1 and 2:1.

6. A process vessel which includes
a body defining an interior vessel surface;
a fixed catalyst bed in the body; and
retaining means on the fixed catalyst bed to retain the fixed catalyst bed in position, the retaining means including a generally horizontally extending layer of tiles or bricks laid on top of the fixed catalyst bed, the layer of tiles or bricks allowing fluid to pass downwardly through the layer, the vessel including a plurality of spaced formations for trapping solid objects whirled around in an annular zone above the layer of tiles or bricks by a fluid passing through the vessel, which whirling solid objects can erode the interior vessel surface above the layer, each formation being defined by a tile or brick in the layer having an increased depth or thickness compared to the depth or thickness of other tiles or bricks in the layer and thus projecting above the other tiles or bricks in the layer.

7. A process vessel as claimed in claim 6, in which the formations are located in an annular zone which is in a plane which is angularly displaced relative to the direction of travel of fluid through the vessel.

8. A process vessel which includes
a body defining an interior vessel surface;
a fixed catalyst bed in the body; and
retaining means on the fixed catalyst bed to retain the fixed catalyst bed in position, the retaining means defining at least one trapping formation at or in close proximity to the interior vessel surface above the fixed catalyst bed to trap solid objects whirled around in an annular zone above the fixed catalyst bed by a fluid passing through the vessel, which whirling solid objects can erode the interior vessel surface in said annular zone.

9. A process vessel as claimed in claim 8, in which said annular zone is in a plane angularly displaced relative to the direction of travel of fluid through the vessel.

10. A process vessel as claimed in claim 7 or claim 9, in which the retaining means defines a plurality of circumferentially spaced trapping formations arranged in a horizontal plane.

11. A process vessel as claimed in claim 8, in which the retaining means is in the form of a generally horizontally extending tile or brick layer configured to allow gas to pass therethrough, and in which each trapping formation is defined by a tile or brick of increased depth or thickness compared to other tiles or bricks in the layer of tiles or bricks and projecting above the upper surface of the tile or brick layer.

* * * * *